(12) United States Patent
Atkinson

(10) Patent No.: US 7,237,531 B2
(45) Date of Patent: Jul. 3, 2007

(54) THROTTLE AND RECIRCULATION VALVES HAVING A COMMON PLANETARY DRIVE

(75) Inventor: David Conway Atkinson, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/154,661

(22) Filed: Jun. 17, 2005

(65) Prior Publication Data

US 2006/0283430 A1    Dec. 21, 2006

(51) Int. Cl.
*F02D 11/10*    (2006.01)
*F02M 25/07*    (2006.01)
*F02B 47/09*    (2006.01)

(52) U.S. Cl. .................. 123/399; 123/568.19

(58) Field of Classification Search ........... 123/342, 123/349, 361, 376, 396, 399, 442, 568.19; 251/129.11, 129.12, 248, 294, 128.11; 74/89.18, 74/411
See application file for complete search history.

(56) References Cited

U.S. PATENT DOCUMENTS

| | | | |
|---|---|---|---|
| 1,490,388 A * | 4/1924 | Harkin | 123/568.19 |
| 3,457,906 A * | 7/1969 | Daigh | 123/568.19 |
| 4,064,851 A | 12/1977 | Wessel | |
| 4,093,180 A | 6/1978 | Strabala | |
| 4,100,734 A | 7/1978 | Ozaki et al. | |
| 4,149,503 A | 4/1979 | Ozaki et al. | |
| 4,224,912 A | 9/1980 | Tanaka | |
| 4,526,060 A * | 7/1985 | Watanabe | 123/349 |
| 4,840,349 A * | 6/1989 | Peter et al. | 251/129.11 |
| 4,924,840 A | 5/1990 | Wade | |
| 4,995,370 A | 2/1991 | Imaeda et al. | |
| 5,040,508 A * | 8/1991 | Watanabe | 123/396 |
| 5,056,309 A | 10/1991 | Linder et al. | |
| 5,213,087 A | 5/1993 | Sausner et al. | |
| 5,265,578 A | 11/1993 | Zabeck et al. | |
| 5,777,412 A * | 7/1998 | Yamamoto | 251/129.11 |
| 6,014,959 A | 1/2000 | Ma | |
| 6,105,559 A | 8/2000 | Stoltman | |
| 6,209,530 B1 | 4/2001 | Faletti et al. | |
| 6,364,284 B1 * | 4/2002 | Imada et al. | 251/248 |
| 6,491,019 B1 * | 12/2002 | Apel | 123/361 |
| 6,748,935 B2 | 6/2004 | Brosseau et al. | |
| 2006/0081077 A1 * | 4/2006 | Spakowski et al. | 74/89.18 |

* cited by examiner

*Primary Examiner*—Willis R. Wolfe, Jr.
(74) *Attorney, Agent, or Firm*—Finnegan, Henderson, Farabow, Garrett & Dunner

(57) ABSTRACT

A valve arrangement for a power source is disclosed. The valve arrangement has a first valve element and a second valve element. The valve arrangement also has an actuator configured to drive the first and second valve elements. The valve arrangement further has a planetary gear arrangement interconnecting the actuator and the first and second valve elements.

26 Claims, 2 Drawing Sheets

THROTTLE AND RECIRCULATION VALVES HAVING A COMMON PLANETARY DRIVE

TECHNICAL FIELD

The present disclosure relates generally to a throttle and recirculation valve configuration and, more particularly, to throttle and recirculation valves that have a common planetary drive.

BACKGROUND

Engines, including diesel engines, gasoline engines, natural gas engines, and other engines known in the art, may exhaust a complex mixture of air pollutants. The air pollutants may be composed of gaseous and solid material, which include Nitrous Oxides (NOx) and particulate matter. Due to increased attention on the environment, exhaust emission standards have become more stringent. The amount of NOx and particulates emitted from an engine may be regulated depending on the type of engine, size of engine, and/or class of engine.

One method that has been implemented by engine manufacturers to comply with the regulation of particulate matter exhausted to the environment has been to recirculate exhaust gas from an engine back into the engine for subsequent combustion. The recirculated exhaust gas reduces the concentration of oxygen in the intake air supplied to the engine, which in turn lowers the maximum combustion temperature within cylinders of the engine. The reduced temperature decreases the formation of NOx. In addition, the exhaust gases contain some amount of particulate matter, which is burned upon recirculation through the engine cylinders, thereby lowering the amount of particulate matter exhausted to the environment.

When implementing exhaust gas recirculation (EGR), it may be necessary to tightly control the proportion of exhaust gas recirculated through the engine. For example, if the amount of exhaust gas recirculated through the engine is too great, the engine may not receive enough oxygen for proper operation and could possibly stall, produce insufficient levels of power, and/or produce excessive amounts of smoke and particulate matter because of poor combustion within the engine cylinders. Conversely, if the amount of exhaust gas recirculated into the engine is too little, the engine may not comply with exhaust emission regulations.

One method of controlling the ratio of exhaust gas and air supplied to the cylinders of an engine is described in U.S. Pat. No. 5,213,087 (the '087 patent), issued to Sausner et al. on May 25, 1993. The '087 patent describes a device for supplying combusted gases at a controlled rate to the combustion chamber of an internal combustion engine. The device includes a throttle valve and an exhaust gas shut-off valve. The throttle and exhaust gas shut-off valve are operated by a common activating means, which includes a rack and pinion gear configuration and a cam device. The rack is connected to a gas pedal and to the cam device. The throttle valve is connected to the pinion gear to rotate in response to translation of the rack. The exhaust gas shut-off valve is connected to a cam follower to move in response to movement of the cam device. As the gas pedal is moved by an operator, the rack translates to both rotate the pinion gear and move the cam device, thereby adjusting the throttle valve and the exhaust gas shut-off valve.

Although the device of the '087 patent may sufficiently control the rate that combustion gas is supplied to the combustion chamber of the internal combustion engine, it may be complicated, costly, and problematic. In particular, because the device of the '087 patent requires many different components to link the throttle valve and the exhaust gas shut-off valve to the gas pedal, the cost and complexity of the system may increase. In addition, because the exhaust gas shut-off valve is not fixedly connected to the throttle valve, but only connected by way of a cam follower, it may be possible for the cam follower to disconnect from the cam device allowing the exhaust gas shut-off valve to supply an incorrect rate of combustion gas. Further, because the throttle and combustion gas shut-off valves are manually controlled, the engine of the '087 patent may be prone to inefficient operation.

The disclosed throttle and recirculation valve configuration is directed to overcoming one or more of the problems set forth above.

SUMMARY OF THE INVENTION

In one aspect, the present disclosure is directed to valve arrangement. The valve arrangement includes a first valve element and a second valve element. The valve arrangement also includes an actuator configured to drive the first and second valve elements. The valve arrangement further includes a planetary gear arrangement interconnecting the actuator and the first and second valve elements.

In yet another aspect, the present disclosure is directed to a method of operating a valve arrangement. The method includes operating a planetary gear arrangement to cause movement of a first valve element and a second valve element.

DETAILED DESCRIPTION

Figure 1:
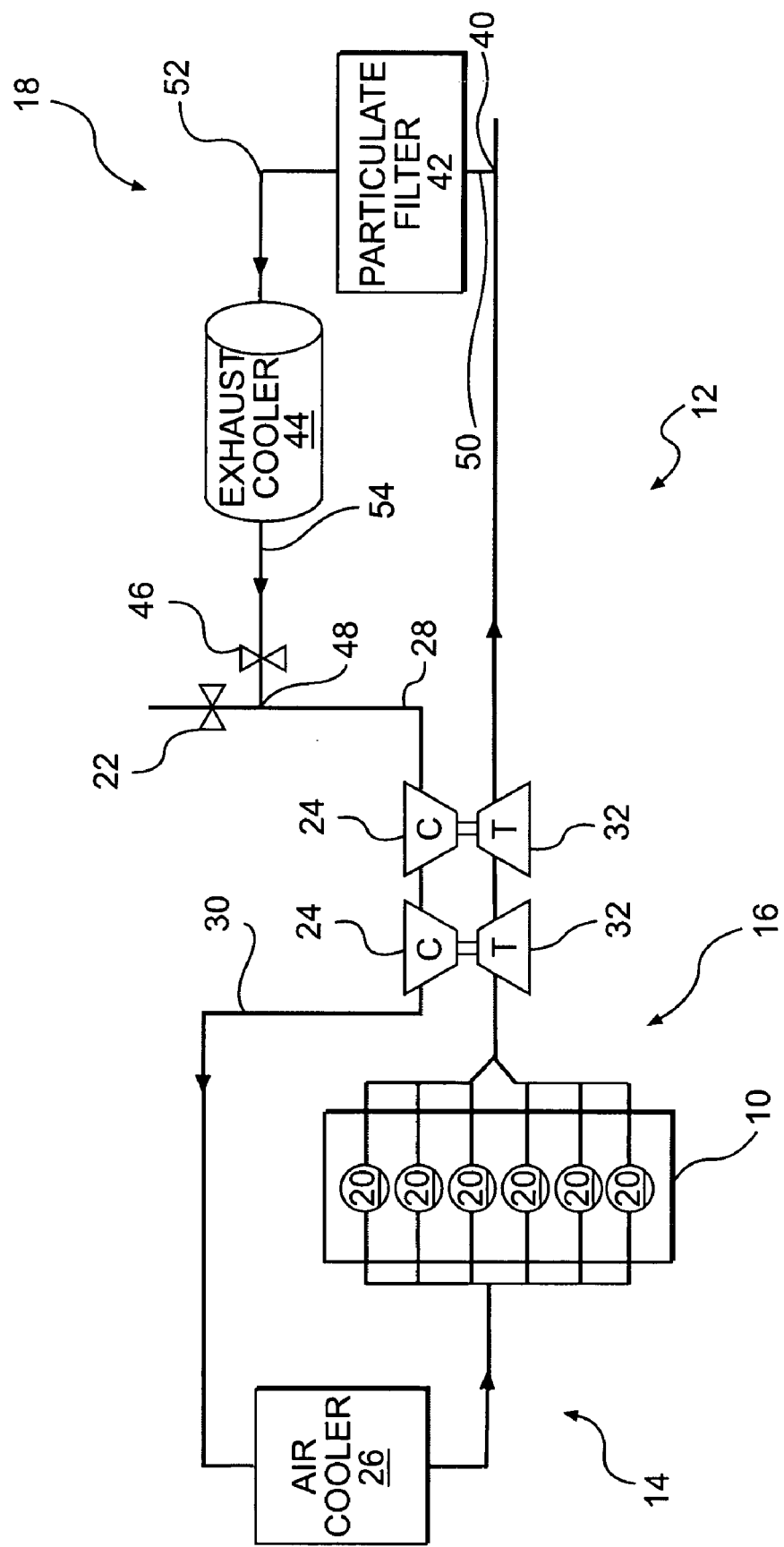
FIG. 1 is a diagrammatic illustration of a power source having an exemplary disclosed throttle and recirculation valve configuration.

FIG. 1 illustrates a power source 10 having an exemplary exhaust treatment system 12. Power source 10 may include an engine such as, for example, a diesel engine, a gasoline engine, a gaseous fuel-powered engine such as a natural gas engine, or any other engine apparent to one skilled in the art. Power source 10 may, alternatively, include another source of power such as a furnace or another suitable source of power. Exhaust treatment system 12 may include an air induction system 14, an exhaust system 16, and a recirculation system 18.

Air induction system 14 may include a means for introducing charged air into a combustion chamber 20 of power source 10. For example, air induction system 14 may include an induction valve element 22, one or more compressors 24, and an air cooler 26. It is contemplated that additional and/or different components may be included within air induction system 14 such as, for example, one or more air cleaners, one or more waste gates, a control system, and other means known in the art for introducing charged air into combustion chambers 20.

Induction valve element 22 may be fluidly connected to compressors 24 via a fluid passageway 28 and configured to regulate the flow of atmospheric air to power source 10. Induction valve element 22 may embody a butterfly valve element, a spool valve element, a shutter valve element, a check valve element, a diaphragm valve element, a gate valve element, a shuttle valve element, a ball valve element, a globe valve element, or any other type of valve element known in the art. Induction valve element 22 may be movable between a flow passing position and a flow restricting position. When in the flow passing position, atmospheric air may be directed into power source 10 substantially unrestricted.

Compressors 24 may be configured to compress the air flowing into power source 10 to a predetermined pressure level. Compressors 24 may be disposed in a series relationship and fluidly connected to power source 10 via a fluid passageway 30. Each of compressors 24 may include a fixed geometry compressor, a variable geometry compressor, or any other type of compressor known in the art. It is contemplated that compressors 24 may alternatively be disposed in a parallel relationship or that air induction system 14 may include only a single compressor 24. It is further contemplated that compressors 24 may be omitted, when a non-pressurized air induction system is desired.

Air cooler 26 may be an air-to-air heat exchanger or an air-to-liquid heat exchanger and configured to facilitate the transfer of heat to or from the air directed into power source 10. For example, air cooler 26 may include a tube and shell type heat exchanger, a plate type heat exchanger, or any other type of heat exchanger known in the art. Air cooler 26 may be connected to power source 10 via fluid passageway 30.

Exhaust system 16 may include a means for directing exhaust flow out of power source 10. For example, exhaust system 16 may include one or more turbines 32 connected in a series relationship. It is contemplated that exhaust system 16 may include additional and/or different components such as, for example, emission controlling devices such as particulate traps, NOx absorbers, or other catalytic devices, attenuation devices, and other means for directing exhaust flow out of power source 10 that are known in the art.

Each turbine 32 may be connected to one compressor 24 and configured to drive the connected compressor 24. In particular, as the hot exhaust gases exiting power source 10 expand against blades (not shown) of turbine 32, turbine 32 may rotate and drive the connected compressor 24. It is contemplated that turbines 32 may alternatively be disposed in a parallel relationship or that only a single turbine 32 may be included within exhaust system 16. It is also contemplated that turbines 32 may be omitted and compressors 24 driven by power source 10 mechanically, hydraulically, electrically, or in any other manner known in the art, if desired.

Recirculation system 18 may include a means for redirecting a portion of the exhaust flow of power source 10 from exhaust system 16 into air induction system 14. For example, recirculation system 18 may include an inlet port 40, a recirculation particulate filter 42, an exhaust cooler 44, a recirculation valve element 46, and a discharge port 48. It is contemplated that recirculation system 18 may include additional and/or different components such as a catalyst, an electrostatic precipitation device, a shield gas system, and other means known in the art for redirecting exhaust from exhaust system 16 into induction system 14.

Inlet port 40 may be connected to exhaust system 16 and configured to receive at least a portion of the exhaust flow from power source 10. Specifically, inlet port 40 may be disposed downstream of turbines 32 to receive exhaust gases from turbines 32. It is contemplated that inlet port 40 may alternatively be located upstream of turbines 32.

Recirculation particulate filter 42 may be connected to inlet port 40 via a fluid passageway 50 and configured to remove particulates from the portion of the exhaust flow directed through inlet port 40. It is contemplated that recirculation particulate filter 42 may include electrically conductive or non-conductive coarse mesh elements. It is also contemplated that recirculation particulate filter 42 may include a catalyst for reducing an ignition temperature of the particulate matter trapped by recirculation particulate filter 42, a means for regenerating the particulate matter trapped by recirculation particulate filter 42, or both a catalyst and a means for regenerating. The catalyst may support the reduction of HC, CO, and/or particulate matter, and may include, for example, a base metal oxide, a molten salt, and/or a precious metal. The means for regenerating may include, among other things, a fuel-powered burner, an electrically-resistive heater, an engine control strategy, or any other means for regenerating known in the art. It is further contemplated that recirculation particulate filter 42 may be omitted, if desired.

Exhaust cooler 44 may be fluidly connected to recirculation particulate filter 42 via a fluid passageway 52 and configured to cool the portion of the exhaust flowing through inlet port 40. Exhaust cooler 44 may include a liquid-to-air heat exchanger, an air-to-air heat exchanger, or any other type of heat exchanger known in the art for cooling an exhaust flow. It is contemplated that exhaust cooler 44 may be omitted, if desired.

Recirculation valve element 46 may be fluidly connected to exhaust cooler 44 via a fluid passageway 54 and configured to regulate the flow of exhaust through recirculation system 18. Recirculation valve element 46 may embody a butterfly valve element, a spool valve element, a shutter valve element, a check valve element, a diaphragm valve element, a gate valve element, a shuttle valve element, a ball valve element, a globe valve element, or any other valve element known in the art. Recirculation valve element 46 may be movable between a flow passing position and a flow restricting position. When in the flow passing position, exhaust from power source 10 may be redirected into power source 10 substantially unrestricted.

A flow characteristic of recirculation valve element 46 may be related to a flow characteristic of induction valve element 22. Specifically, the movements of recirculation valve element 46 and induction valve element 22 may both be controlled such that an amount of exhaust flow entering air induction system 14 via recirculation valve element 46 may be related to an amount of air flow entering air induction system 14 via induction valve element 22. For example, as the flow of exhaust through recirculation valve element 46 increases, the flow of air through induction valve element 22 may proportionally decrease. Likewise, as the flow of exhaust through recirculation valve element 46 decreases, the flow of air through induction valve element 22 may proportionally increase.

Discharge port 48 may be fluidly connected to recirculation valve element 46 and configured to direct the exhaust flow regulated by recirculation valve element 46 into air induction system 14. Specifically, discharge port 48 may be connected to air induction system 14 upstream of compressors 24, such that compressors 24 may draw the exhaust flow from discharge port 48.

Figure 2:
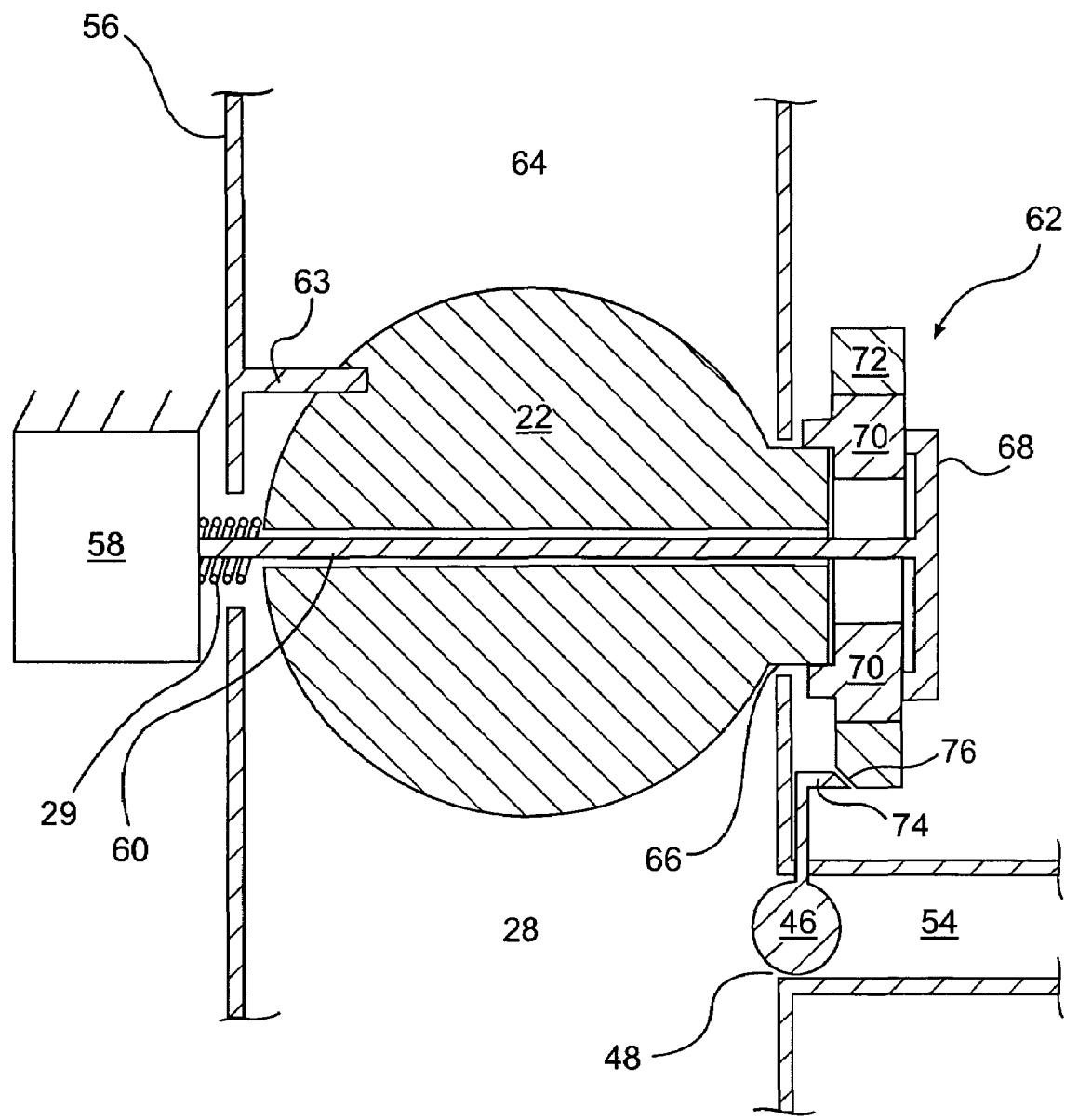
FIG. 2 is a cross-sectional illustration of an exemplary disclosed throttle and recirculation valve configuration.

As illustrated in FIG. 2, both induction valve element 22 and recirculation valve element 46 may be disposed within a common housing 56 and driven by a common actuator 58 to facilitate the flow characteristic relationship described above. In particular, common actuator 58 may be connected to induction valve element 22 and recirculation valve element 46 by way of an input driveshaft 60 and a planetary gear arrangement 62.

Common housing 56 may have an air inlet 64 configured to receive atmospheric air and in fluid communication with fluid passageways 28 and 54. Induction valve 22 may be disposed between inlet 64 and fluid passageway 28 to selectively restrict the flow of atmospheric air from inlet 64 to fluid passageway 28. Recirculation valve element 46 may be disposed between fluid passageway 54 and fluid passageway 28 to selectively restrict the flow of exhaust from fluid passageway 54 to fluid passageway 28. The term restrict, for the purposes of this disclosure, is to be interpreted as at least partially blocked from fluid flow. It is also contemplated that induction valve 22 and/or recirculation valve 46, when in the flow restricting position, may be fully blocked from fluid flow.

Common actuator 58 may be configured to rotate driveshaft 60. For example, common actuator 58 may embody a motor configured to controllably rotate continuously or in a step-wise manner. In one example, common actuator 58 may be configured to rotate drive shaft 60 through a maximum angle of about 90°. It is contemplated that common actuator 58 may be electrically operated, mechanically operated, hydraulically operated, pneumatically operated, manually operated, or operated in any other manner known in the art. Common actuator may be directly connected to driveshaft 60, or may be connected via a ratcheting device, a pulley system, a gear system, or in any other appropriate manner. It is contemplated that common actuator 58 may selectively rotate driveshaft 60 in response to one or more inputs.

Driveshaft 60 may be rotatably connected to common actuator 58 and extend through induction valve element 22 to connect with planetary gear arrangement 62. Driveshaft 60 may be configured to transmit mechanical power from common actuator 58 to planetary gear arrangement 62. It is contemplated that one or more bearings (not shown) may be associated with driveshaft 60 to support, guide, and/or reduce the friction of rotation of driveshaft 60.

Planetary gear arrangement 62 may be configured to receive the rotational input from driveshaft 60 and induce a corresponding rotation of induction valve element 22 and recirculation valve element 46. In particular, planetary gear arrangement 62 may include a sun gear 66 fixedly connected to induction valve element 22, a planet carrier 68 operably supporting a plurality of planet gears 70, and a ring gear 72 operably connected to recirculation valve element 46. Planet gears 70 may mesh with sun gear 66 and ring gear 72 such that sun gear 66, planetary carrier 68, planet gears 70, and ring gear 72 all rotate together simultaneously in response to an input rotation of driveshaft 60

Planetary gear arrangement 62 may receive an input rotation from driveshaft 60 at a first speed and generate a corresponding output rotation at a second speed. The change in rotational speed between the input and the output may depend upon the number of teeth in sun gear 66, planet gears 70 mounted to planet carrier 68, and ring gear 72. In one example, the output speed sun gear 66 and/or ring gear 72 may be twice the input speed.

Ring gear 72 may be operatively connected to recirculation valve element 46 by way of a sector gear 74. In particular, sector gear 74 may be fixedly connected to ring gear 72 and configured to engage a bevel gear 76 fixedly connected to recirculation valve element 46 such that a rotation of ring gear 72 results in a rotation of recirculation valve element 46. In this manner, the rotation of recirculation valve element 46 may be generally orthogonal to the rotation of induction valve element 22. It is contemplated that a different gearing arrangement may alternatively be included such that the rotation of recirculation valve element 46 may be substantially aligned with the rotation of induction valve element 22.

The relative angle between induction valve element 22 and recirculation valve element 46 may be determined by the engagement of sector gear 74 and bevel gear 76. For example, sector gear 74 may engage bevel gear 76 such that induction valve element 22 is substantially in the flow passing position when recirculation valve element 46 is substantially in the flow blocking position. In this manner, as driveshaft 60 rotates to move induction valve element 22 toward the flow restricting position, recirculation valve element 46 may be moved toward the flow passing position. The angular relationship between induction valve element 22 and recirculation valve element 46 may be modified by engaging different teeth of sector gear 74 and bevel gear 76.

INDUSTRIAL APPLICABILITY

The disclosed exhaust treatment system may be applicable to any combustion-type device such as, for example, an engine, a furnace, or any other combustion device known in the art where exhaust gas may be directed from an exhaust system to an air intake system for subsequent combustion. Exhaust treatment system 12 may be a simple, inexpensive, and compact solution to controlling the amount of intake air and exhaust gas directed into the combustion device. The operation of exhaust treatment system 12 will now be explained.

Atmospheric air may be drawn into air induction system 14 via induction valve element 22 to compressors 24 where it may be pressurized to a predetermined level before entering combustion chamber 20 of power source 10. Fuel may be mixed with the pressurized air before or after entering combustion chamber 20. This fuel-air mixture may then be combusted by power source 10 to produce mechanical work and an exhaust flow containing gaseous compounds and solid particulate matter. The exhaust flow may be directed from power source 10 to turbines 32 where the expansion of hot exhaust gases may cause turbines 32 to rotate, thereby rotating connected compressors 24 to compress the inlet air. After exiting turbines 32, the exhaust gas flow may be divided into two flows, including a first flow redirected to air induction system 14 and a second flow directed to the atmosphere.

As the first exhaust flow moves through inlet port 40 of recirculation system 18, it may be filtered by recirculation particulate filter 42 to remove particulate matter prior to communication with exhaust cooler 44. The particulate matter, when deposited on the elements of recirculation particulate filter 42, may be passively and/or actively regenerated.

The flow of the reduced-particulate exhaust from recirculation particulate filter 42 may be cooled by exhaust cooler 44 to a predetermined temperature and then directed through recirculation valve element 46 to be drawn back into air induction system 14 by compressors 24. The recirculated exhaust flow may then be mixed with the air entering combustion chambers 20. The exhaust gas, which is directed to combustion chambers 20, may reduce the concentration of oxygen therein, which in turn lowers the maximum combustion temperature within power source 10. The lowered maximum combustion temperature may slow the chemical reaction of the combustion process, thereby decreasing the formation of nitrous oxides. In this manner, the gaseous pollution produced by power source 10 may be reduced without experiencing the harmful effects and poor performance caused by excessive particulate matter being directed into power source 10.

The ratio of cooled and reduced-particulate exhaust from recirculation system 18 relative to inlet air may be regulated by common actuator 58. As described above, the positions and movements of recirculation valve element 46 and induction valve element 22 between the flow passing and flow restricting may be related. As common actuator 58 rotates to increase the flow of inlet air into power source 10 via induction valve element 22, the flow of cooled reduced-particulate exhaust into power source 10 may be simultaneously decreased by way of planetary gear arrangement 62. In particular, as common actuator 58 rotates driveshaft 60, planet carrier 68 may rotate correspondingly. The rotation of planet carrier 68 may drive opposing rotations of sun gear 66 and ring gear 72 that cause induction valve element 22 to move toward the flow passing position and restriction valve element 46 to move toward the flow restricting position. Similarly, as the flow of inlet air into power source 10 via induction valve element 22 decreases, the flow of cooled reduced-particulate exhaust into power source 10 may increase.

As the second flow of exhaust leaves turbines 32, it may be filtered by a second particulate filter (not shown) to remove particulate matter and/or directed through a catalyst to remove other pollutants from the exhaust. Similar to recirculation particulate filter 42, the second particulate filter may also be passively and/or actively regenerated to reduce the amount of HC, CO, and/or particulate matter exhausted to the atmosphere.

Because induction valve element 22, recirculation valve element 46, and common actuator 58 are connected by way of a single common planetary gear arrangement, the valve arrangement may be simple, cost efficient, and improve performance of power source 10. In particular, because the number of links between common actuator 58, induction valve element 22, recirculation valve element 46 are minimized the associated cost may also be minimized. In addition, the planetary gear arrangement 52 may minimize the likelihood of disconnect between movements of induction valve element 22, recirculation valve element 46, and common actuator 58. Further, because induction valve element 22 and recirculation valve element 46 may be automatically movable by common actuator 58 in response to one or more inputs, the operation of power source 10 may be more finely tuned, as compared to a manual operation.

It will be apparent to those skilled in the art that various modifications and variations can be made to the disclosed valve arrangement. Other embodiments will be apparent to those skilled in the art from consideration of the specification and practice of the disclosed valve arrangement. It is intended that the specification and examples be considered as exemplary only, with a true scope being indicated by the following claims and their equivalents.

What is claimed is:

1. A power source, comprising:
   an air induction system configured to direct atmospheric air into the power source;
   an exhaust system configured to direct exhaust away from the power source;
   a recirculation system configured to redirect at least a portion of the exhaust from the exhaust system to the air induction system; and
   a valve arrangement in communication with the air induction system and the recirculation system, the valve arrangement including:
      a first valve element movable between a flow blocking position at which atmospheric air is restricted from flowing into a power source, and a flow passing position at which the atmospheric air is substantially free to flow into the power source;
      a second valve element movable between a flow blocking position at which exhaust from the power source is restricted from flowing into the power source, and a flow passing position the flow of exhaust into the power source is substantially unrestricted;
      an actuator configured to drive the first and second valve elements; and
      a planetary gear arrangement interconnecting the actuator and the first and second valve elements, the planetary gear arrangement being configured to drive the first and second valve elements separately.

2. The power source of claim 1, further including a housing common to the first and second valve elements.

3. The power source of claim 1, wherein the first and second valve elements are operatively connected to a plurality of gears of the planetary gear arrangement.

4. The power source of claim 1, wherein:
   the first valve element is connected to a sun gear of the planetary gear arrangement;
   the second valve element is operatively connected to a ring gear of the planetary gear arrangement; and
   the actuator is connected to a planet carrier of the planetary gear arrangement.

5. The power source of claim 4, further including a sector gear connecting the second valve element to the ring gear.

6. The power source element of claim 4, further including a driveshaft extending from the actuator through the first valve element and sun gear to the planet carrier.

7. The power source of claim 6, wherein:
   the actuator is configured to rotate the driveshaft through a maximum of about 90 degrees; and
   an output rotation of the planetary gear arrangement is about two times the input rotation.

8. A method of operating a valve arrangement comprising operating a planetary gear arrangement to cause movement of a first valve element and a second valve element, the operating of the planetary gear arrangement includes driving the first and second valve elements separately using the planetary gear arrangement.

9. The method of claim 8, wherein movement includes:
   movement of the first valve element between a flow restricting position at which atmospheric air is restricted from flowing into a power source, and a flow passing position at which the flow of atmospheric air into the power source is substantially unrestricted; and
   movement of the second valve element between a flow restricting position at which exhaust from the power source is restricted from flowing into the power source, and a flow passing position the flow of exhaust into the power source is substantially unrestricted.

10. The method of claim 8, wherein the first and second valve elements are operatively connected to a plurality of gears of the planetary gear arrangement.

11. The method of claim 8, wherein operating includes rotating a driveshaft that extends through the first valve element and is connected to a planet carrier of the planetary gear arrangement.

12. The method of claim 11, wherein rotating a driveshaft includes rotating the driveshaft through a maximum of about 90 degrees.

13. The method of claim 12, wherein driving the planet carrier also rotates a ring gear connected to the second valve element.

14. The method of claim 11, wherein operating further includes driving the planet carrier to rotate a sun gear connected to the first valve element.

15. The method of claim 12, wherein an output rotation of the sun gear is about two times the input rotation of the driveshaft.

16. A valve arrangement, comprising:
a first valve element;
a second valve element;
an actuator configured to drive the first and second valve elements; and
a planetary gear arrangement interconnecting the actuator and the first and second valve elements, the first valve element being connected to a sun gear of the planetary gear arrangement.

17. The valve arrangement of claim 1, further including a housing common to the first and second valve elements.

18. The valve arrangement of claim 1, wherein the actuator and the first and second valve elements are operatively connected to a plurality of gears of the planetary gear arrangement.

19. The valve arrangement of claim 1, wherein the first valve element is movable between a flow restricting position at which atmospheric air is restricted from flowing into a power source, and a flow passing position at which the flow of atmospheric air into the power source is substantially unrestricted.

20. The valve arrangement of claim 19, wherein the second valve element is movable between a flow restricting position at which exhaust from the power source is restricted from flowing into the power source, and a flow passing position the flow of exhaust into the power source is substantially unrestricted.

21. The valve arrangement of claim 1, wherein the second valve element is operatively connected to a ring gear of the planetary gear arrangement.

22. The valve arrangement of claim 21, wherein the actuator is operatively connected to a planet carrier of the planetary gear arrangement.

23. The valve arrangement of claim 22, further including a sector gear connecting the second valve element to the ring gear.

24. The valve arrangement of claim 22, further including a driveshaft extending from the actuator through the first valve element and sun gear to the planet carrier.

25. The valve arrangement of claim 24, wherein the actuator is configured to rotate the driveshaft through a maximum of about 90 degrees.

26. The valve arrangement of claim 25, wherein an output rotation of the planetary gear arrangement is about two times the input rotation.

* * * * *